(12) United States Patent
Long

(10) Patent No.: US 8,490,510 B2
(45) Date of Patent: Jul. 23, 2013

(54) ROBOT ARM MECHANISM AND ROBOT USING THE SAME

(75) Inventor: Bo Long, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 233 days.

(21) Appl. No.: 13/088,518

(22) Filed: Apr. 18, 2011

(65) Prior Publication Data

US 2012/0048051 A1    Mar. 1, 2012

(30) Foreign Application Priority Data

Aug. 30, 2010   (CN) .......................... 2010 1 0266824

(51) Int. Cl.
*B25J 17/00*    (2006.01)
(52) U.S. Cl.
USPC .......... 74/490.01; 74/490.02; 901/43; 901/49
(58) Field of Classification Search
USPC ............... 74/490.01, 490.02, 490.05; 901/14, 901/15, 16, 23, 40, 43, 49
See application file for complete search history.

(56) References Cited

U.S. PATENT DOCUMENTS

| | | | | |
|---|---|---|---|---|
| 3,602,746 | A * | 8/1971 | St. Clair ........................ | 310/55 |
| 6,222,289 | B1 * | 4/2001 | Adames ......................... | 310/54 |
| 6,298,684 | B1 * | 10/2001 | Mitsuyoshi .................... | 62/337 |
| 6,408,710 | B1 * | 6/2002 | Kullborg et al. ........... | 74/490.03 |
| 6,459,178 | B1 * | 10/2002 | Malfa et al. ..................... | 310/52 |
| 6,633,097 | B2 * | 10/2003 | Dunlap et al. .................. | 310/54 |
| 6,811,124 | B2 * | 11/2004 | Karlinger ....................... | 248/49 |
| 6,819,016 | B2 * | 11/2004 | Houle et al. .................... | 310/52 |
| 7,122,923 | B2 * | 10/2006 | Lafontaine et al. ............. | 310/58 |
| 7,202,442 | B2 * | 4/2007 | Nakagiri et al. ........... | 219/137.9 |
| 7,464,622 | B2 * | 12/2008 | Markert et al. ............ | 74/490.01 |
| 7,476,992 | B2 * | 1/2009 | Rutsyamuka ................... | 310/53 |
| 7,551,981 | B2 * | 6/2009 | Salamanca .................... | 700/259 |
| 7,622,001 | B2 * | 11/2009 | Inada et al. ................... | 118/323 |
| 7,768,166 | B2 * | 8/2010 | Lafontaine et al. ............. | 310/90 |
| 8,336,420 | B2 * | 12/2012 | Carter et al. .............. | 74/490.05 |

FOREIGN PATENT DOCUMENTS

| CN | 101096100 A | 1/2008 |
|---|---|---|
| JP | 7-246587 A | 9/1995 |

* cited by examiner

*Primary Examiner* — David M Fenstermacher
(74) *Attorney, Agent, or Firm* — Altis Law Group, Inc.

(57) ABSTRACT

A robot arm mechanism includes a first shaft assembly, a second shaft assembly, a first motor, a second motor, and an air tubing assembly. The second shaft assembly is rotatably assembled with the first shaft assembly. The first motor is selectively assembled within the first shaft assembly or the second shaft assembly. The air tubing assembly is assembled within the first shaft assembly or the second shaft assembly, and surrounds the first motor for cooling down the first motor, surrounds the second motor for cooling down the second motor, and cooling down the inner temperature of the robot. A robot using the robot arm mechanism is further provided.

16 Claims, 5 Drawing Sheets

US 8,490,510 B2

ROBOT ARM MECHANISM AND ROBOT USING THE SAME

BACKGROUND

1. Technical Field

This disclosure relates to robotics, and particularly, to a robot arm mechanism and a robot using the same.

2. Description of Related Art

Presently, robots are widely used in automated production settings A commonly used robot generally includes a plurality of rotary shafts and a plurality of motors assembled with the robot for driving the rotary shafts to rotate. In use, the motors generate much heat thereby sharply increasing the internal temperature within the robot. This may cause the motor encoder of the robot to send an alarm or even cause the robot to stop working. Therefore, cooling fans are assembled within the robot to dissipate and carry the heat to outside of the robot. However, the existing cooling fans occupy a relatively large amount of space within the robot, which means that the inner structure of the robot is made larger.

Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the robot arm mechanism and robot using the same. Moreover, in the drawings like reference numerals designate corresponding parts throughout the several views. Wherever possible, the same reference numerals are used throughout the drawings to refer to the same or like elements of an embodiment.

DETAILED DESCRIPTION

Figure 1:
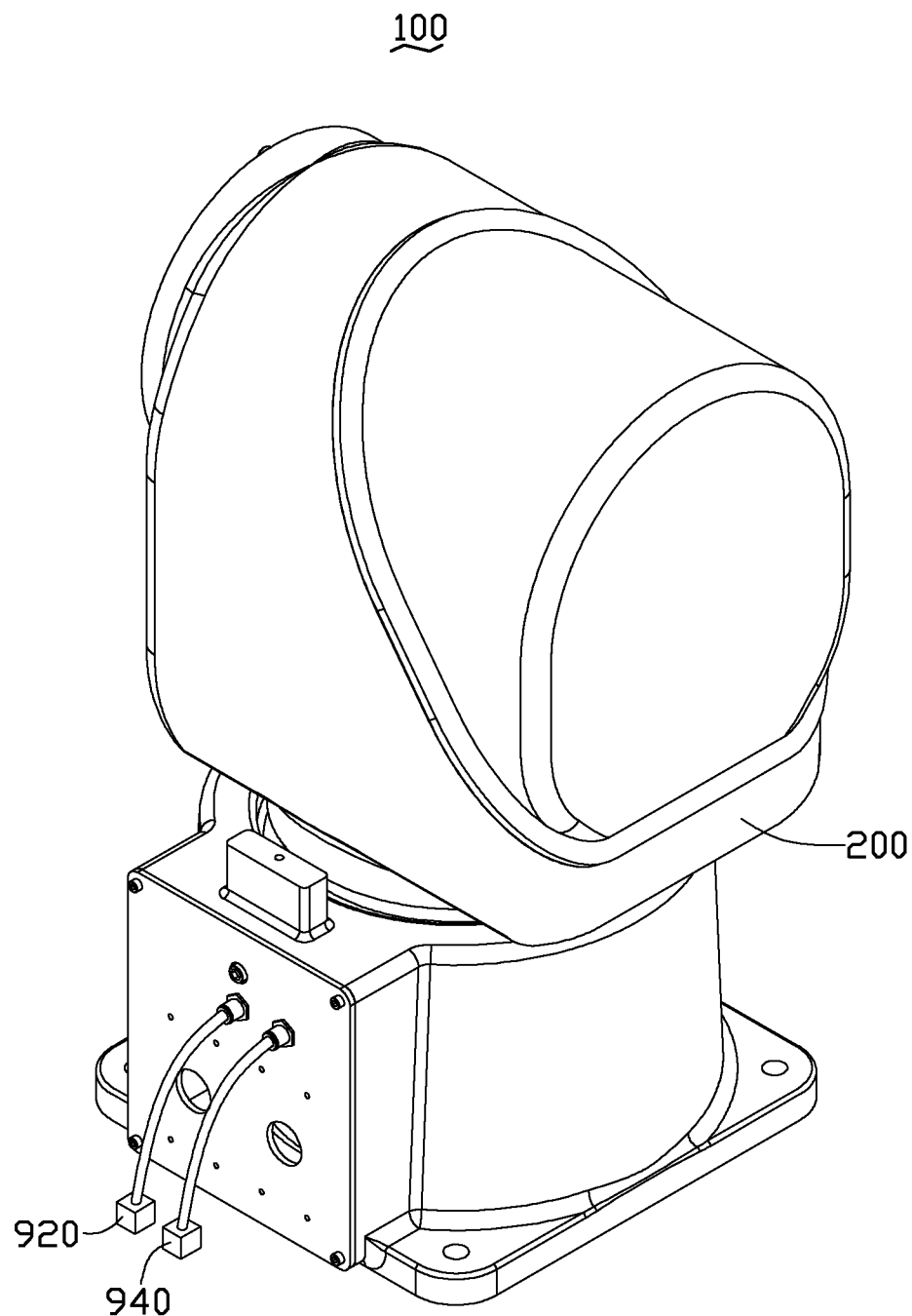
FIG. 1 shows an assembled isometric view of an embodiment of a robot, wherein, the robot includes a robot arm mechanism, an air source, and an air evacuating equipment.
Figure 2:
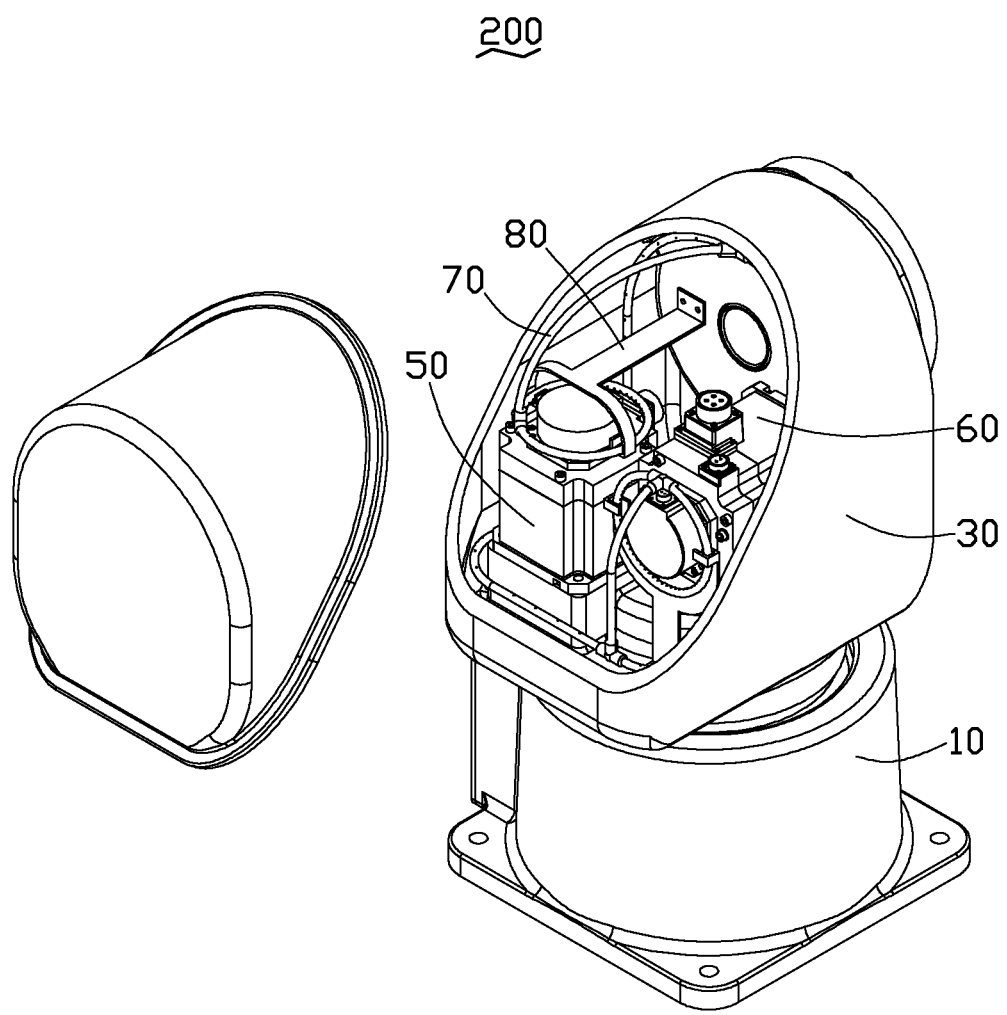
FIG. 2 shows a partially exploded isometric view of the robot arm mechanism of FIG. 1.
Figure 3:
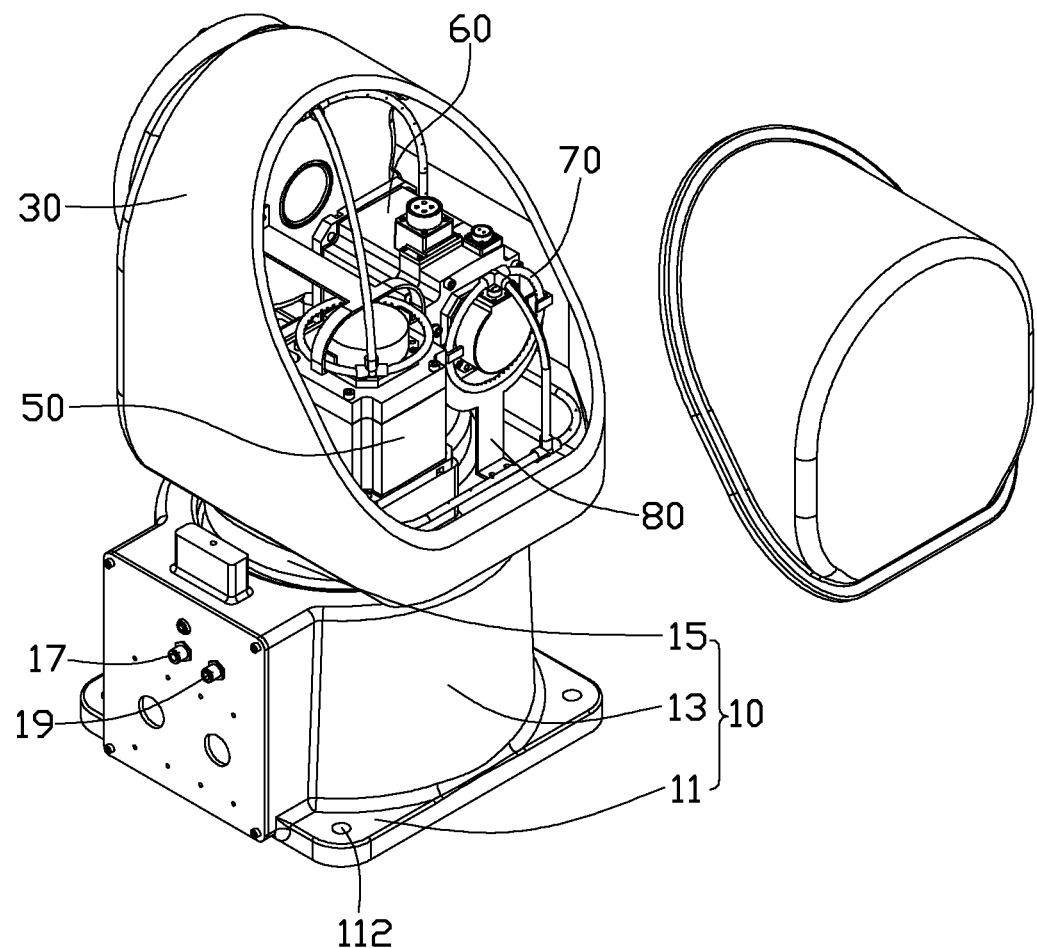
FIG. 3 is similar to FIG. 2, but viewed from another aspect.
Figure 4:
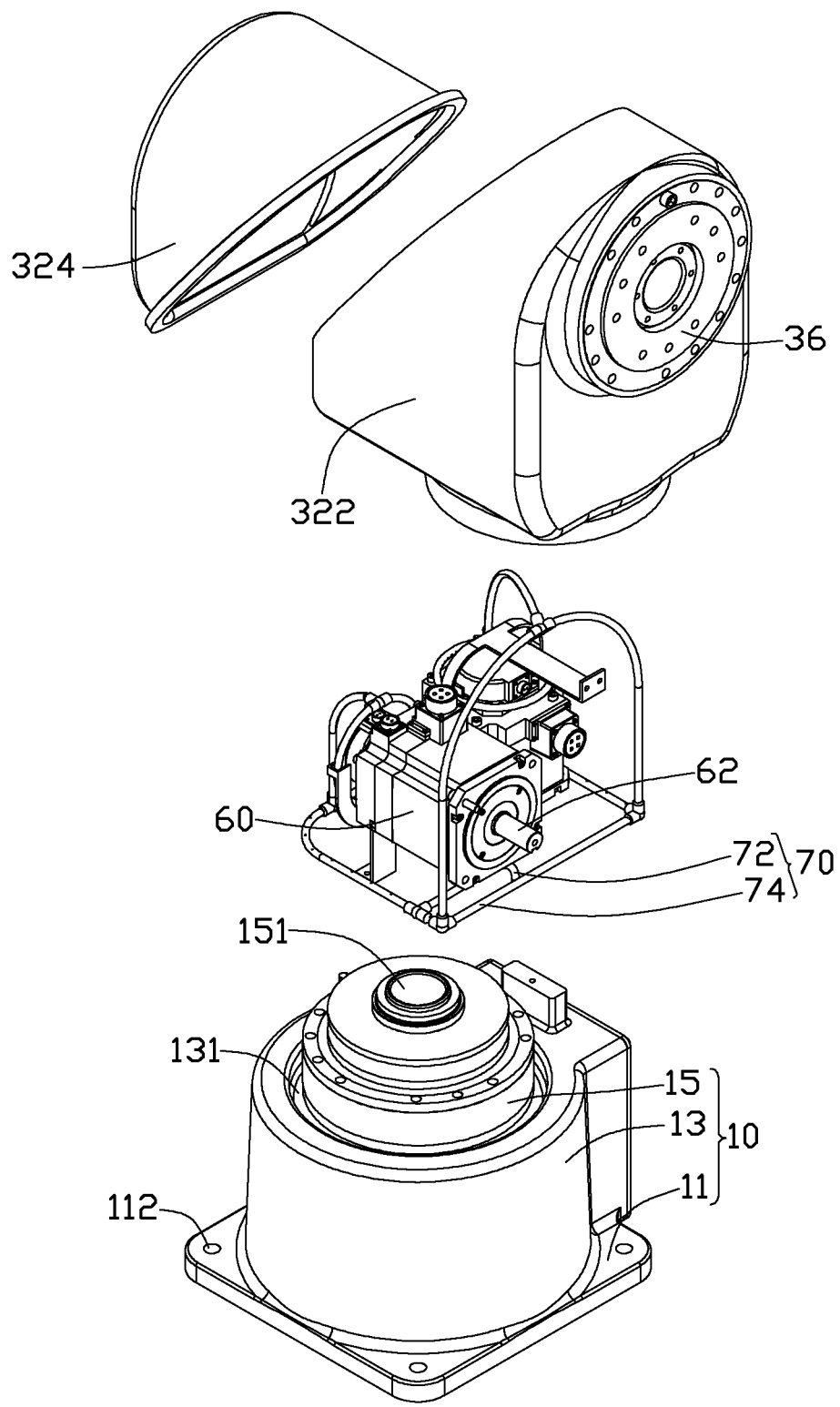
FIG. 4 shows an exploded isometric view of the robot arm mechanism of FIG. 1.

Referring to FIGS. 1 through 4, an embodiment of a robot 100 includes a robot arm mechanism 200, an air source 920 and an air evacuating equipment 940. The robot arm mechanism 200 includes a first shaft assembly 10, a second shaft assembly 30 rotatably assembled with the first shaft assembly 10, a first motor 50, a second motor 60, an air tubing assembly 70 and a support member 80. The first and second motors 50, 60 are selectively assembled within the first shaft assembly 10 and/or the second shaft assembly 30. In the illustrated embodiment, the first and second motors 50, 60 are both assembled within the second shaft assembly 30. The air tubing assembly 70 is assembled within the first shaft assembly 10 and/or the second shaft assembly 30, and surrounds the first and second motors 50, 60, and further connects with the air source 920 and the air evacuating equipment 940 for cooling down the inner temperature of the robot 100.

The first shaft assembly 10 includes a base 11, a first shell 13, a first output shaft 15, an air inlet port 17 and an air evacuating port 19. The base 11 is a substantially rectangular board, and includes four mounting holes 112 respectively defined through four corners of the base 11.

The first shell 13 is a substantially hollow cylinder extending from and covering the base 11. The first shell 13 defines a connecting shaft hole 131 through a distal end positioned away from and substantially perpendicular to the base 11.

The first output shaft 15 is rotatably assembled within the connecting shaft hole 131 of the first shell 13. The first output shaft 15 defines a first wire hole 151 axially.

The air inlet port 17 is disposed on the first shell 13 with one end connected to the air source 920, and the other end connected to the air tubing assembly 70.

The air evacuating port 19 is also disposed on the first shell 13 and positioned adjacent to the air inlet port 17. One end of the air evacuating port 19 communicates with the inner space of the first shell 13. The other end of the air evacuating port 19 is connected to the air evacuating equipment 940 for exhausting the air within the robot 100.

Figure 5:
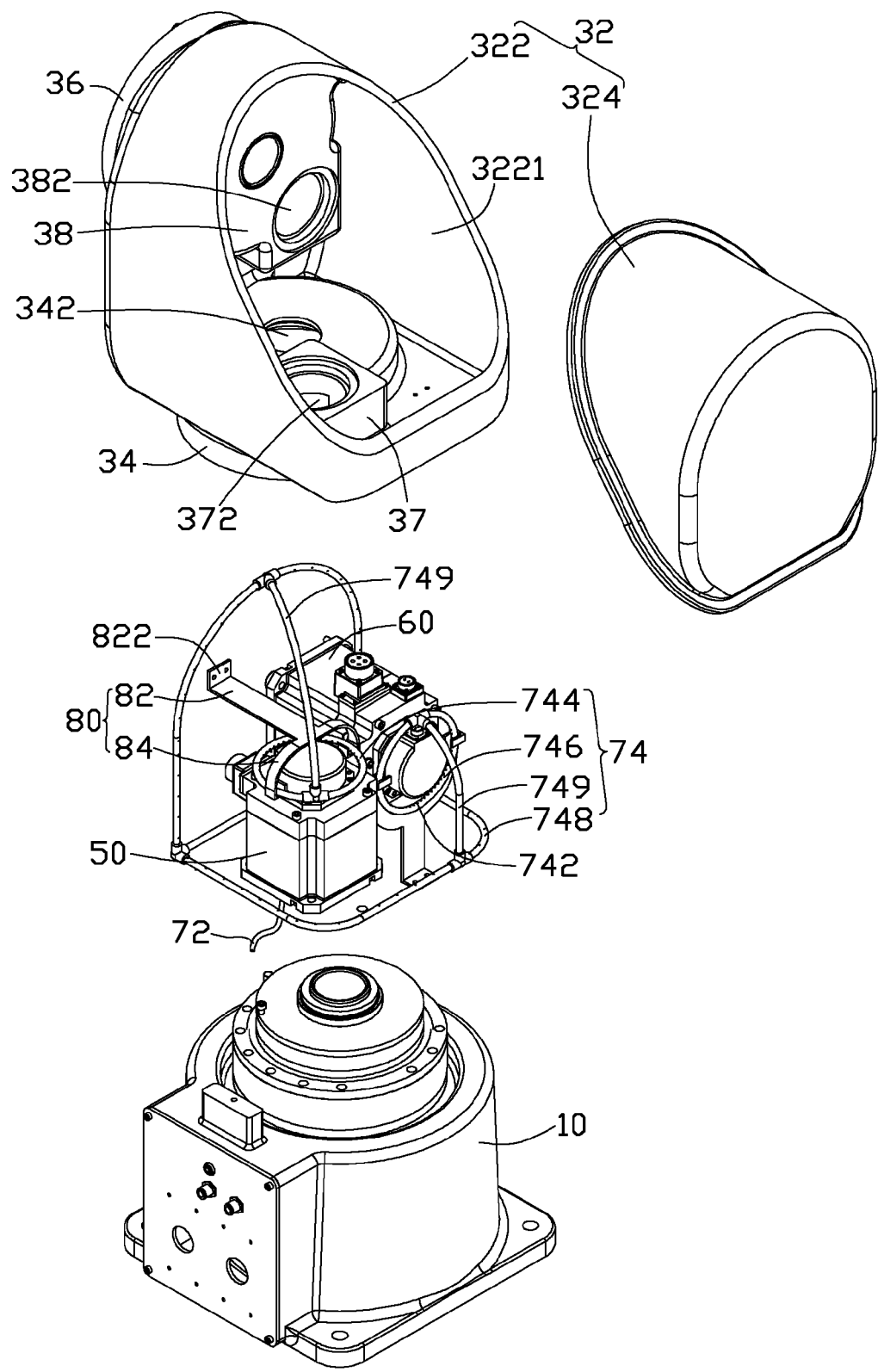
FIG. 5 is similar to FIG. 4, but viewed from another aspect.

Also referring to FIG. 5, the second shaft assembly 30 includes a second shell 32, a connecting portion 34 formed on the second shell 32, a second output shaft 36, a first fixing member 37 and a second fixing member 38. The second shell 32 is also substantially hollow cylindrical and includes a main body 322 and a cover 324. The main body 322 defines an opening 3221 at one end. The cover 324 is detachably assembled to the main body 322 for covering the opening 3221.

The connecting portion 34 is formed at one side of the main body 322 and configured for fixing with the first output shaft 15 of the first shaft assembly 10. The connecting portion 34 defines a second wire hole 342 corresponding to the first wire hole 151 of the first output shaft 15.

The second output shaft 36 is rotatably assembled to the other end of the main body 322 of the second shell 32 and is positioned away from the opening 3221. In the illustrated embodiment, the second output shaft 36 is perpendicular to the first output shaft 15.

The first fixing member 37 and the second fixing member 38 are both formed and received within the second shell 32. The first fixing member 37 connects with the connecting portion 34 and is positioned adjacent to the first wire hole 151 of the first output shaft 15. The first fixing member 37 defines a first shaft hole 372 perpendicular to the second output shaft 36. The second fixing member 38 is positioned at a same end with the second output shaft 36 and defines a second shaft hole 382 parallel to the second output shaft 36.

The first motor 50 is assembled to the first fixing member 37 and received within the second shell 32. A rotary shaft (not shown) of the first motor 50 passes through the first shaft hole 372 of the first fixing member 37 and is connected to the first output shaft 15 of the first shaft assembly 10 by a transmission assembly (not shown), thereby driving the first output shaft 15 to rotate relative to the first shell 13.

The second motor 60 is assembled to the second fixing member 38 and received within the second shell 32. The second motor 60 includes a rotary shaft 62. The rotary shaft 62 of the second motor 60 passes through the second shaft hole 382 of the second fixing member 38 and is connected to the second output shaft 36 of the second shaft assembly 30 with a transmission assembly (not shown), thereby driving the second output shaft 36 to rotate relative to the second shell 32.

The air tubing assembly 70 includes an air intake pipe 72 and an air vent 74. One end of the air intake pipe 72 is connected with the air inlet port 17, the other end of the air intake pipe 72 passes through the second wire hole 342 of the connecting portion 34 and the first wire hole 151 of the first output shaft 15, then enters into the second shell 32, and finally connects with the air vent 74. The air vent 74 defines a plurality of air blow holes 742 selectively facing toward the first motor 50 and/or the second motor 60. The plurality of air blow holes 742 of the air vent 74 are configured for blowing air to the first and second motors 50, 60 and cooling down the inner temperature of the robot 100. It is to be understood that the air vent 74 could include a plurality of air tubings communicating with each other and surrounding the first and second motors 50, 60. In one embodiment, the air vent 74 includes a first circulating loop 744 surrounding the first motor 50, a second circulating loop 746 surrounding the second motor 60, a third circulating loop 748 arranged within the second shell 32, and a plurality of connecting pipes 749. The first, second and third circulating loops 744, 746, 748 are connected to each other with the plurality of connecting pipes 749.

The support member 80 is assembled within the second shell 32 for supporting the air tubing assembly 70. In one embodiment, there are two support members 80 fixed to the second shell 32 and are connected with the first and second circulating loops 744 and 746, respectively. Each support member 80 includes a fixing portion 82 and a support portion 84. The fixing portion 82 is a substantially rectangular board, where one end of the fixing portion 82 is bent to form a fixing end 822 and fixed to the second shell 32. The support portion 84 is substantially arc-shaped and formed at the opposite other end of the fixing portion 82. Two ends of the support portion 84 are connected to the corresponding air vent 74. The air vent 74 is made of a rigid material such as hard rubber, hard plastics, or other similar hard materials.

During use of the robot 100, the air inlet port 17 of the first shaft assembly 10 is connected to the air source 920, thus, the outside cooler air can be drawn within into the robot 100 by the air intake pipe 72 and the air vent 74. The air passing through the first, second and third circulating loops 744, 746, 748 is directly and continuously blowing towards the first motor 50, the second motor 60 and the second shell 32, thereby cooling down the inner temperature of the robot 100. The hot air within the robot 100 can be evacuated to the outside of the robot 100 from the air evacuating port 19 with the air evacuating equipment 940.

It is to be understood that, the first and second motors 50, 60 are not limited to be assembled within the second shell 32 of the second shaft assembly 30. The first and second motors 50, 60 can also be assembled within the first shell 13 of the first shaft assembly 10, and the air vent 40 can be arranged within the first shell 13 to cool down the first and second motors 50, 60.

It is to be understood, however, that even through numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A robot arm mechanism, comprising:
   a first shaft assembly;
   a second shaft assembly rotatably assembled with the first shaft assembly;
   a first motor selectively assembled within the first shaft assembly or the second shaft assembly; and
   an air tubing assembly assembled within the first shaft assembly or the second shaft assembly, wherein the air tubing assembly comprises an air intake pipe and an air vent connected with the air intake pipe, and the air vent surrounds the first motor to blow air to the first motor for cooling down the first motor.

2. The robot arm mechanism as claimed in claim 1, wherein first shaft assembly comprises a first shell and a first output shaft rotatably assembled within the first shell; the second shaft assembly comprises a second shell and a second output shaft rotatably assembled within the second shell; the first motor is assembled within the second shell and connected with the first output shaft for driving the first output shaft to rotate relative to the first shell.

3. The robot arm mechanism as claimed in claim 2, wherein the first shaft assembly further comprises an air inlet port and an air evacuating port; the air inlet port and the air evacuating port are separately defined through the first shell one end of the air intake pipe is connected to the air inlet port, and the other end of the air intake pipe is connected with the air vent, and the air vent is arranged within the second shell and surrounds the outer side of the first motor.

4. The robot arm mechanism as claimed in claim 2, wherein the first shaft assembly further comprises a base, the first shell is substantially hollow cylindrical and covering on the base; the first shell defines a connecting shaft hole, and the first output shaft is rotatably assembled within the connecting shaft hole.

5. The robot arm mechanism as claimed in claim 3, wherein the second shaft assembly further comprises a connecting portion formed on the second shell, the connecting portion is fixed with the first output shaft; the second output shaft is rotatably assembled with the second shell along a direction perpendicular to the first output shaft.

6. The robot arm mechanism as claimed in claim 5, wherein the first output shaft defines a first wire hole axially; the connecting portion defines a second wire hole corresponding to the first wire hole of the first output shaft; the other end of the air intake pipe passes through the two wire holes, and then enters into the second shell, and finally connects with the air vent.

7. The robot arm mechanism as claimed in claim 6, wherein the second shaft assembly further comprises a fixing member formed at one end of the second shell, and a shaft hole defined through the fixing member; the robot arm mechanism further comprises a second motor, the second motor is assembled to the fixing member and received within the second shell; the second motor includes a rotary shaft passing through the shaft hole and connected to the second output shaft, thereby driving the second output shaft to rotate relative to the second shell.

8. The robot arm mechanism as claimed in claim 7, wherein the air vent comprises a plurality of air tubings communicating with each other and surrounding the first and second motors; the air vent defines a plurality of air blow holes selectively facing toward the first motor and/or the second motor.

9. The robot arm mechanism as claimed in claim 7, wherein the air vent comprises a first circulating loop surrounding the first motor, a second circulating loop surrounding the second motor, and a third circulating loop arranged within the second shell.

10. A robot, comprising:
    an air source; and
    a robot arm mechanism comprising:
    a first shaft assembly;
    a second shaft assembly rotatably assembled with the first shaft assembly;
    a first motor selectively assembled within the first shaft assembly or the second shaft assembly; and an air tubing assembly assembled within the first shaft assembly or the second shaft assembly, wherein the air tubing assembly comprises an air intake pipe connected to the air source and an air vent connected with the air intake pipe, and the air vent surrounds the first motor to blow air to the first motor for cooling down the first motor.

11. The robot as claimed in claim 10, wherein the first shaft assembly comprises a first shell and a first output shaft rotatably assembled within the first shell; the second shaft assembly comprises a second shell and a second output shaft rotatably assembled within the second shell; the first motor is assembled within the second shell and connected with the first output shaft for driving the first output shaft to rotate relative to the first shell.

12. The robot as claimed in claim 11, wherein the first shaft assembly further comprises an air evacuating port defined through the first shell, one end of the air intake pipe is connected to the air source, and the other end of the air intake pipe is connected with the air vent, and the air vent is arranged within the second shell and surrounds the outer side of the first motor; the robot further comprises an air evacuating equipment connected to the air evacuating port.

13. The robot as claimed in claim 11, wherein the second shaft assembly further comprises a connecting portion formed on the second shell, the connecting portion is fixed with the first output shaft; the second output shaft is rotatably assembled with the second shell along a direction perpendicular to the first output shaft.

14. The robot as claimed in claim 13, wherein the first output shaft defines a first wire hole axially; the connecting portion defines a second wire hole corresponding to the first wire hole of the first output shaft; the other end of the air intake pipe passes through the two wire holes, and then enters into the second shell, and finally connects with the air vent.

15. The robot as claimed in claim 14, wherein the second shaft assembly further comprises a fixing member formed at one end of the second shell, and a shaft hole defined through the fixing member; the robot arm mechanism further comprises a second motor, the second motor is assembled to the fixing member and received within the second shell; the second motor includes a rotary shaft passing through the shaft hole and connected to the second output shaft, thereby driving the second output shaft to rotate relative to the second shell.

16. The robot as claimed in claim 15, wherein the air vent comprises a plurality of air tubings communicating with each other and being surrounded to the first and second motors; the air vent defines a plurality of air blow holes selectively facing toward the first motor and/or the second motor.

* * * * *